(12) United States Patent
Wild

(10) Patent No.: US 9,306,642 B2
(45) Date of Patent: Apr. 5, 2016

(54) PROVIDING CHANNEL STATE INFORMATION ABOUT A RADIO CHANNEL

(75) Inventor: Thorsten Wild, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 277 days.

(21) Appl. No.: 14/005,040

(22) PCT Filed: Jan. 17, 2012

(86) PCT No.: PCT/EP2012/050598
§ 371 (c)(1),
(2), (4) Date: Sep. 13, 2013

(87) PCT Pub. No.: WO2012/123143
PCT Pub. Date: Sep. 20, 2012

(65) Prior Publication Data
US 2013/0343282 A1    Dec. 26, 2013

(30) Foreign Application Priority Data
Mar. 14, 2011    (EP) .................................... 11290129

(51) Int. Cl.
*H04B 7/04*      (2006.01)
*H04L 25/02*      (2006.01)
(Continued)

(52) U.S. Cl.
CPC .......... *H04B 7/0417* (2013.01); *H04L 25/0204* (2013.01); *H04L 25/0214* (2013.01);
(Continued)

(58) Field of Classification Search
CPC ............... H04B 7/0417; H04B 7/0626; H04L 25/0204; H04L 25/0214; H04L 25/0236; H04L 25/03955; H04L 5/023; H04L 25/0222
USPC ......................................................... 370/328
See application file for complete search history.

(56) References Cited

U.S. PATENT DOCUMENTS

2005/0058095 A1    3/2005   Sadri et al.
2005/0118955 A1*   6/2005   Denk et al. ...................... 455/65
(Continued)

OTHER PUBLICATIONS

International Search Report for PCT/EP2012/050598 dated Mar. 2, 2012.
(Continued)

*Primary Examiner* — Mark Rinehart
*Assistant Examiner* — Ellen A Kirillova
(74) *Attorney, Agent, or Firm* — Fay Sharpe LLP

(57) ABSTRACT

The invention relates to a method for providing channel state information, CSI, about a radio channel (4) established between a first network element (2) and a second network element (3), the method comprising: providing an estimate ($h_n$) of a channel coefficient ($h_{n,a}$) of the radio channel (4) based on at least one signal, in particular a pilot signal (7), transmitted over the radio channel (4) from the first network element (2) to the second network element (3), making a prediction (I) of the channel coefficient ($h_{n,a}$) of the radio channel (4) based on previous estimates ($h_{n,k}$), and feeding back information about an error ($e_n$) between the prediction (I) and the estimate ($h_n$) of the channel coefficient ($h_{n,a}$) from the second network element (3) to the first network element (2). The invention also relates to network elements (2, 3) for implementing the method, as well as to a wireless communication network (1) comprising the same.

11 Claims, 1 Drawing Sheet

(51) Int. Cl.
  *H04L 25/03* (2006.01)
  *H04B 7/06* (2006.01)
  *H04L 5/00* (2006.01)
(52) U.S. Cl.
  CPC ...... *H04L25/0236* (2013.01); *H04L 25/03955* (2013.01); *H04B 7/0626* (2013.01); *H04L 5/0023* (2013.01); *H04L 25/0222* (2013.01)

(56) References Cited

U.S. PATENT DOCUMENTS

| | | | |
|---|---|---|---|
| 2006/0018389 A1* | 1/2006 | Koorapaty et al. | 375/259 |
| 2009/0122854 A1 | 5/2009 | Zhu et al. | |
| 2009/0221238 A1 | 9/2009 | Ko et al. | |

OTHER PUBLICATIONS

3GPP TS 36.213, Evolved Universal Terrestrial Radio Access (E-UTRA), V9.3.0, Sep. 2010, pp. 1-80 (Section 7.2, in particular).

T. Wild, "A rake-finger based efficient channel state information feedback compression scheme," Bell Laboratories, Wireless Access Domain ZFZ/WA5, Stuttgart, Germany, May 2010, 5 pages.

J. Makhoul, "Linear Prediction: A Tutorial Review," Proceedings of the IEEE, vol. 63, No. 4, Apr. 1975.

S. Valentin, "Studying the sum capacity of mobile multiuser diversity systems with feedback errors and delay," Bell Laboratories, Alcatel-Lucent, Germany, Sep. 2010, 5 pages.

* cited by examiner

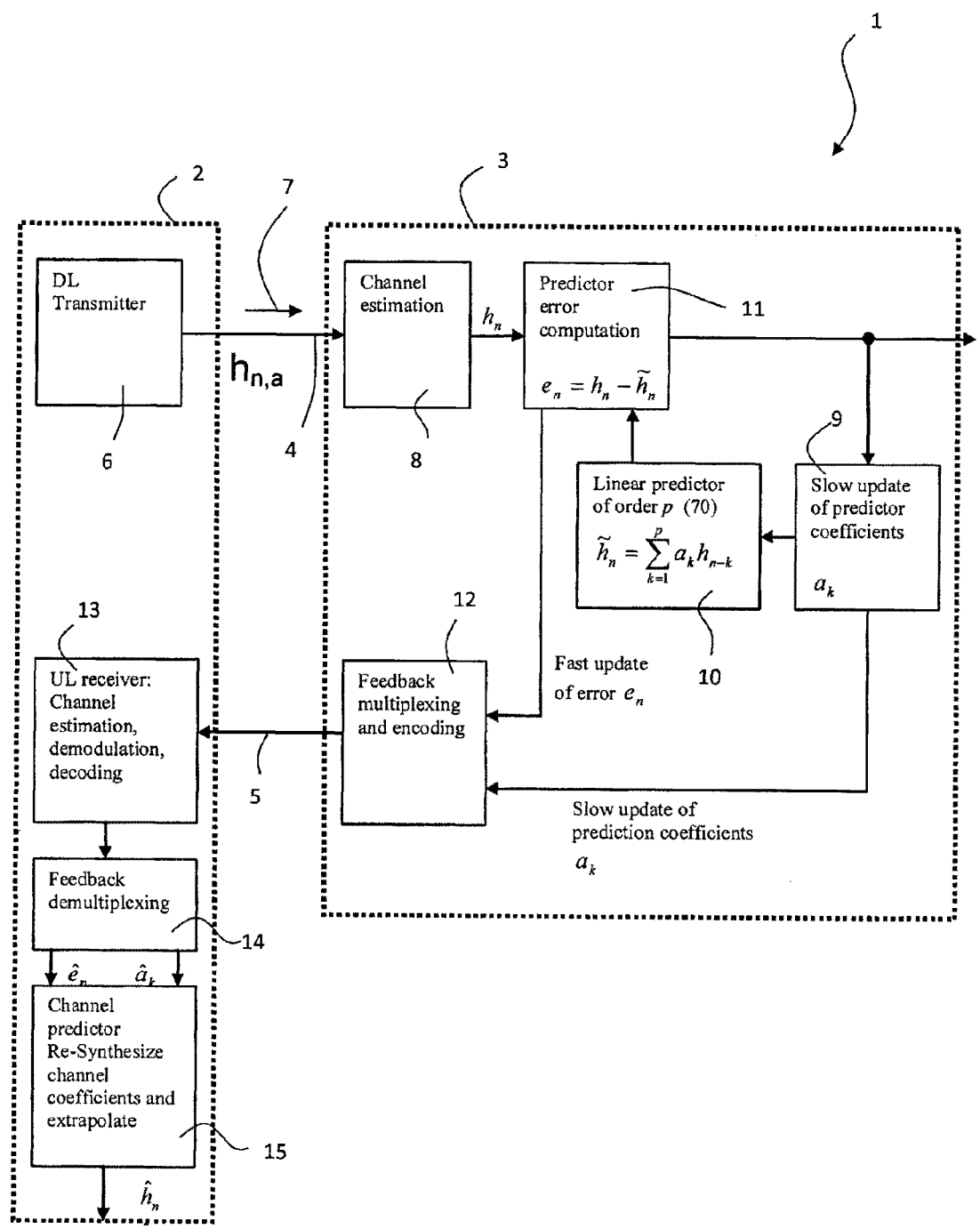

PROVIDING CHANNEL STATE INFORMATION ABOUT A RADIO CHANNEL

FIELD OF THE INVENTION

The invention relates to the field of telecommunications, and, more specifically, to methods and network elements for providing channel state information (CSI) about a radio channel, established e.g. between a base station and a mobile terminal.

BACKGROUND

This section introduces aspects that may be helpful in facilitating a better understanding of the invention. Accordingly, the statements of this section are to be read in this light and are not to be understood as admissions about what is in the prior art or what is not in the prior art.

In many wireless systems, a base station adapts the transmission mode for each user (e.g. a mobile station) according to its current channel state. Depending on the system's physical layer (PHY), such an adaptive downlink scheme may define the transmit rate, power, frequency band, and/or precoding matrix. To do so, the base station requires accurate Channel State Information (CSI) of the downlink towards each particular user. In many systems, e.g., LTE and IEEE 802.16, the Uplink and Downlink channels cannot be assumed to be fully reciprocal. Hence, CSI is obtained at the User Equipment and fed back to the base station via the wireless uplink.

One major problem of the CSI feedback from the user equipment is the feedback delay in conjunction with channel ageing. Inherently, mobile communication systems have a certain feedback delay. When the mobile terminal moves (or channel reflectors) the radio channel changes during that feedback delay ("channel ageing") and thus the feedback information for the downlink transmission is no more accurate.

As indicated above, mobile communication systems have an inherent feedback delay. For instance, in 3GPP LTE/LTE-A, this delay cannot be below 4 ms, for the following reason: 1 ms is required for sending downlink pilots, 1 ms is required for channel estimation, feedback calculation and waiting for the next appropriate uplink sub-frame, 1 ms is required for uplink feedback transmission, and 1 ms is required for uplink reception, feedback extraction and waiting for the next downlink sub-frame in order to use the obtained feedback information. Additional processing times increase the feedback delay. It is shown, e.g. in [3], that this delay severely degrades the feedback performance.

One way of dealing with this problem aims at making the processing (for channel estimation, decoding etc.) as fast as possible. This is a straightforward approach which is handled by Moore's Law, but cannot overcome inherent bounds (like 4 ms for LTE).

A second solution would be to completely change the air interface frame structure—e.g. bringing the LTE sub-frame length of 1 ms down to 0.5 ms or even less. This approach helps to reduce the delays, but will at a certain point reach its limits: For instance, cyclic prefix length coping with multipath propagation cannot be arbitrarily reduced for a certain cell size, otherwise inter-symbol and inter-carrier interference will degrade the performance. A second limit is the coding gain: Reducing sub-frame lengths reduces codeblock sizes and thus reduces the coding performance.

A second major problem of CSI feedback from a user equipment is the resulting feedback overhead, which reduces the available throughput of the actual uplink data transmission. For mitigating this problem, it has been proposed to reduce the CSI overhead based on transformations and concentration on the strongest channel taps, as shown in [2].

SUMMARY

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

A first aspect of the invention relates to a method for providing channel state information about a radio channel established between a first network element and a second network element, the method comprising: providing an estimate of a channel coefficient of the radio channel based on at least one signal, in particular on a pilot signal, transmitted over the radio channel from the first network element to the second network element, making a prediction of the channel coefficient of the radio channel based on previous estimates, and feeding back information about an error between the prediction and the estimate of the channel coefficient from the second network element to the first network element.

According to the invention, in the second network element, the channel, respectively, a channel coefficient is both estimated based on current transmissions and predicted based on previous channel estimates. For the prediction, methods known from prediction theory (e.g. linear prediction [1]) may be used. As the first network element may also perform a prediction of the channel, i.e. may extrapolate the evolution of the channel, it is sufficient to provide only the prediction error as the actual CSI feedback, thus reducing the feedback overhead and also the feedback delay.

In one variant, the prediction of the channel coefficient is based on a time series of previous estimates combined with prediction coefficients, in particular with linear prediction coefficients. As indicated above, the prediction of the channel may be performed using results from prediction theory, in particular from linear prediction theory. For instance, a linear predictor $\tilde{h}_n$ of order p may be defined as:

$$\tilde{h}_n = -\sum_{k=1}^{p} a_k h_{n-k}, \qquad (1)$$

with $a_k$ representing the (linear) prediction coefficients. Although linear prediction theory provides a simple and efficient way for performing channel predictions, one skilled in the art may of course resort to more evolved (non-linear) prediction theory for making the channel predictions.

In one improvement, the method further comprises: updating the prediction coefficients, and providing feedback information about the updated prediction coefficients from the second network element to the first network element, the information about the updated prediction coefficients being fed back less frequently than the information about the error between the prediction and the estimate. The channel prediction coefficients may be fed back at a low rate, as they only have to be changed if the long-term properties of the channel fundamentally change, which happens in the order of about 100 ms or more. In contrast thereto, the actual CSI feedback which consists of the prediction error has to be fed back in the order of 1 ms (or more) in order to take fast fading (short-term evolution) of the channel into account. Note that the time scale examples described herein refer to a typical 3G or 4G cellular system with a carrier frequency in the order of 2 GHz. As the prediction coefficients are already describing the channel evolution, only a small amount of bits is required for the CSI feedback which indicates the short-term deviation (error) from the predicted evolution of the channel.

In the above description, the temporal evolution of only a single (complex valued) channel coefficient, i.e. of a SISO channel, has been explained. However, one skilled in the art will appreciate that the method described above may be easily generalized to the case of a MIMO system where a coefficient Matrix $H_n$ instead of a single channel coefficient $h_n$ has to be predicted.

In a further improvement, the radio channel is one of a plurality of MIMO channels between the first network element and the second network element, and only a single set of updated prediction coefficients is fed back for all MIMO channels. Usually, the autocorrelation of the temporal fading is the same for all antennas, so that in order to reduce required feedback rates, only a single set of prediction coefficients needs to be transmitted for all antennas.

In another improvement, the radio channel is a multipath channel and only a single set of updated prediction coefficients is fed back for the multipath channel, possibly in conjunction with a set of per-tap and/or per-antenna error coefficients. In this respect, it should be noted that the prediction coefficients depend on the channel statistics, given by the Doppler spectrum. In most cases, the Doppler spectrum for all taps and all antenna-to-antenna links is very similar. This means that one set of prediction coefficients is usually sufficient—saving feedback overhead. Nevertheless, an individual initial channel state (error coefficient) per tap and antenna-to-antenna link may be required for initialization and the update of the prediction error coefficients, being a function of the fast fading, which may be uncorrelated, and has to be determined individually per tap and per antenna-to-antenna link. In the time-domain representation of such a multipath channel, a MIMO coefficient matrix is required for each multipath tap. As is the case for MIMO systems, for typical multipath channels, the required feedback rates may also be reduced by transmitting only a single set of prediction coefficients for all antennas and multipath taps. Alternatively, the same kind of approach may be used for a frequency domain representation of the channel on a per-subcarrier or per-subband basis. In particular, the solution described above may be advantageously combined with compressed time-domain feedback as described in [2] providing a large amount of feedback reduction by concentrating on the strongest channel taps. The solution proposed herein may now further reduce feedback overhead by combining the compression method ("rake compression") as described in [2] with the above-described (linear) prediction method for each of the (strongest) channel taps.

In another variant, the method further comprises: multiplexing and encoding the information about the error and the information about the updated prediction coefficients, and providing both types of feedback from the second network element to the first network element using the same feedback channel. Although the feedback about the precoding coefficients is provided less frequently than the feedback about the error/deviation, both types of feedback can be provided on the same uplink feedback channel, possibly together with other control information which is specific for the second network element (which may be devised as a user equipment or the like).

In a further variant, the method further comprises: in the first network element, estimating the channel coefficient by making a prediction of the channel coefficient, and correcting the prediction using the feedback information about the error between the prediction and the estimate. The actual estimated channel may be obtained by summing up the predicted signal (based on previous channel estimates) and the respective error coefficient $e_n$, i.e.: $h_n = e_n + \tilde{h}_n$, with $\tilde{h}_n$ being defined as in equation (1). For actual implementations, due to feedback delay, an extrapolation of the channel has to be performed, as will be detailed below.

A second aspect of the invention relates to a network element, in particular a mobile terminal, adapted to provide channel state information (CSI) about a radio channel, comprising at least one processing means adapted to: provide an estimate of a channel coefficient of the radio channel based on at least one signal, in particular a pilot signal, received from a further network element over the radio channel, make a prediction of the channel coefficient of the radio channel based on previous estimates, and provide feedback information about an error between the prediction and the estimate of the channel coefficient to the further network element. As indicated above, the network element, e.g. a mobile terminal, may only feed back the error of the prediction on a fast timescale, the further network element using the error for correcting its own channel prediction in the way which has been described above.

In one embodiment, the processing means are adapted to make the prediction of the channel coefficient based on a time series of previous estimates combined with prediction coefficients, in particular with linear prediction coefficients. As indicated above, prediction theory, in particular linear prediction theory, may be used for providing predictions of the channel coefficient.

In one improvement, the processing means are further adapted to: update the prediction coefficients, and provide feedback information about the updated prediction coefficients from the network element to the further network element, the information about the updated prediction coefficients being fed back less frequent than the information about the error between the prediction and the estimate. As indicated above, the channel prediction coefficients may be fed back on a low rate, as they only have to be changed when some long-term properties of the channel fundamentally change (e.g. in the order of 100 ms), whereas the error is fed back on a higher rate (in the order of about 1 ms), due to the fast fading of the channel. The prediction coefficients may be fed back in regular time intervals (e.g. each 100 ms), or alternatively the prediction coefficients may be updated trigger-based. In the latter case, once a certain difference to the old set of prediction coefficients has been recognized, an update of the prediction coefficients is triggered.

In a further embodiment, the radio channel is one of a plurality of MIMO channels between the first network element and the second network element, and the processing means are adapted to feed back only a single set of updated prediction coefficients for all MIMO channels. When two or more antennas are used at the second network element for establishing MIMO communications with the first network element, the autocorrelation of the temporal fading is typically the same for all antennas, so that only a single set of prediction coefficients needs to be provided as a feedback when using the plurality of MIMO channels, possibly in conjunction with individual prediction error coefficients plus individual initial channel states, as described above.

In another embodiment, the radio channel is a multipath channel and the processing means are adapted to feed back only a single set of updated prediction coefficients for the multipath channel. As indicated above, also for a multipath channel, it may be sufficient to provide only a single set of prediction coefficients as a feedback to the first network element. Furthermore, the amount of feedback may be further reduced by concentrating on the strongest channel taps, as described in [2], thus further reducing the feedback overhead.

In one embodiment, the processing means are further adapted to multiplex and encode the information about the error and the information about the updated prediction coefficients, and to provide both types of feedback from the network element to the further network element using the same feedback channel, possibly together with further control information which is specific for the network element (e.g. in the form of a user equipment).

A third aspect of the invention relates to a network element, in particular a base station, adapted to estimate a channel coefficient of a radio channel, the network element comprising at least one processing means adapted to: receive information about an error between a prediction and an estimate of the channel coefficient of the radio channel from a further network element, estimate the channel coefficient by making a prediction of the channel coefficient based on previous estimates, and to correct the prediction using the feedback information about the error between the prediction and the estimate.

The actual estimated channel may be obtained by summing up the predicted signal (based on previous channel estimates) and the respective error coefficient. However, in case of a feedback delay, an extrapolation in the future (based on a linear prediction) is advantageous in order to obtain a channel coefficient with improved accuracy. As the prediction coefficients are only slowly changing, they may be assumed as constant for the prediction. However, what is missing for the extrapolation is the error coefficient for one or more discrete (future) time steps. For the extrapolation, one may set missing error coefficients to zero. For the simple example of a feedback delay of one time step, assuming that the older channels $h_{n-k}$ are already corrected by their respective error coefficients $e_{n-k}$, the new extrapolated (predicted) channel is thus just $$\hat{h}_n = \sum_{k=1}^{p} a_k h_{n-k}.$$

A fourth aspect of the invention relates to a wireless communication network, comprising: at least one network element according to the second aspect of the invention and at least one network element according to the third aspect of the invention. In the above description, it has been assumed that channel state information is provided for a downlink channel (e.g. from a base station to a mobile station) via an uplink feedback channel (e.g. from a mobile station to a base station). However, it should be noted that the roles of the first network element (mobile station) and of the second network element (base station) may easily be exchanged, thus signaling the uplink channel state information via a downlink feedback channel.

Further features and advantages are stated in the following description of exemplary embodiments, with reference to the FIGURES of the drawing, which shows significant details, and are defined by the claims. The individual features can be implemented individually by themselves, or several of them can be implemented in any desired combination.

BRIEF DESCRIPTION OF THE FIGURES

Exemplary embodiments are shown in the diagrammatic drawing and are explained in the description below. The following are shown:

FIGURE shows a schematic diagram of a downlink radio channel from a base station to a mobile station and of an uplink feedback channel for providing channel state information about the downlink channel with reduced feedback overhead.

DESCRIPTION OF THE EMBODIMENTS

The functions of the various elements shown in the FIGURES, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGURES are conceptual only. Their function may be carried out through the operation of program logic, through dedicated logic, through the interaction of program control and dedicated logic, or even manually, the particular technique being selectable by the implementer as more specifically understood from the context.

The FIGURE shows a block diagram of a wireless network 1, more specifically, only a base station 2 and a mobile terminal 3 thereof. A wireless downlink channel 4 is established for providing downlink data, e.g. user data, from the base station 2 to the mobile terminal 3. The base station 2 uses an adaptive downlink scheme which defines the transmit rate, power, frequency band, and/or precoding matrix in dependence of the conditions on the downlink channel. To do so, the base station 2 requires accurate Channel State Information (CSI) of the downlink channel 4 towards the mobile terminal 3.

However, in the present wireless system being of the LTE type, the uplink and downlink channels cannot be assumed to be fully reciprocal, especially in the case of frequency division duplex (FDD), but also for time division duplex (TDD) in case of lacking or inaccurate radio frequency (RF) calibration between base station transmitter and receiver chain. Consequently, deriving channel information from a corresponding uplink channel is not sufficient for providing accurate channel state information. Consequently, the channel state information is obtained at the mobile terminal 3 (being devised e.g. as a user equipment) and fed back to the base station 2 via a wireless uplink channel 5 serving as a feedback channel.

It should be noted that in the following, it is assumed that feedback of the downlink channel 4 (from the base station 2 to the mobile station 3) is provided via an uplink feedback channel 5 (from the mobile station 3 to the base station 2). However, one skilled in the art will appreciate that the roles of the mobile station 3 and of the base station 2 may easily be exchanged with the intention to signal the uplink channel state information via a downlink feedback channel (however, without loss of generality, this case will not be considered in the following).

In the following, the prediction of the temporal evolution of a channel state information in the form of a single complex valued (actual) channel coefficient $h_{n,a}$ of the downlink channel 4 will be described, the channel coefficient $h_{n,a}$ belonging to the discrete time step n. In this respect, it is desired to obtain an estimate $h_n$ of the channel state information, resp., of the channel coefficient $h_{n,a}$ at the base station 2 even when there is only outdated feedback information from time instants n−1 or even older (n−2, n−3, ... ). For a LTE system, such a discrete time interval would e.g. correspond—but is not limited to—the sub-frame length and transmission time interval (TTI) of 1 ms, or multiples thereof.

For providing the estimate $h_n$ in the downlink of the mobile communication system 1, the base station 2 transmits pilot symbols 7 from a downlink transmitter 6 over the downlink radio channel 4, which has an (actual) channel coefficient designated as $h_{n,a}$. Alternatively, when the mobile terminal 3 uses blind detection, the pilot symbols 7 may be omitted. In any case, channel estimation is performed in a channel estimation unit 8 of the mobile terminal 3 in order to obtain an estimated complex-valued channel coefficient $h_n$.

In addition to the estimation, linear prediction coefficients $a_1, \ldots, a_p$ (written compactly as $a_k$) are computed in a prediction coefficient determining unit 9 from a time series of current and previous (estimated) channel coefficients which are matched to the temporal evolution of the radio conditions for that particular mobile terminal 3 in its particular radio environment. The determination of the prediction coefficients $a_k$ may be done e.g. by taking into account a time window for computing the locally stationary autocorrelation function, see e.g. [1] for further details.

Now, in a predictor determining unit 10, a linear predictor/prediction $\tilde{h}_n$ of order p for the (estimated) channel coefficient $h_n$ is computed based on previous channel realizations:

$$\tilde{h}_n = \sum_{k=1}^{p} a_k h_{n-k}.$$

The predicted channel coefficient $\tilde{h}_n$ usually deviates from the actual estimated channel $h_n$ by an error $e_n = h_n - \tilde{h}_n$, which is computed in a corresponding prediction error estimation unit 11 of the mobile terminal 3.

While the prediction error $e_n$ changes in the order of e.g. 1 ms, i.e. with the temporal change of fast fading which is based on movements in the order of carrier frequency wavelengths (resulting e.g. for LTE in time-scales of about 1 ms or more), the change of the autocorrelation realization and thus of the prediction coefficients $a_k$ is based on the Doppler spectrum and reflector positions. As accelerations for mobile station movement have certain limits and cellular system design supports only limited velocities (e.g. up to 250 km/h for LTE), the autocorrelation and thus the prediction coefficients $a_k$ remain stable for a certain time, e.g. in the order of 100 ms or more. Consequently, the prediction coefficients $a_k$ have to be fed back less frequently than the prediction error $e_n$.

Both types of feedback ($e_n$, $a_k$) are quantized, multiplexed and encoded onto the uplink feedback channel 5 in a feedback encoding and multiplexing unit 12, optionally together with other control information which is specific for the mobile terminal 3. As indicated above, in contrast to the prediction error $e_n$, the prediction coefficients $a_k$ are only slowly changing, e.g. on a time scale of the order of 100 ms. The prediction coefficients $a_k$ may thus be fed back in regular time intervals (e.g. each 100 ms), or an update of the prediction coefficients $a_k$ may be performed trigger-based, i.e. once a certain difference to the old set of prediction coefficients $a_k$ has occurred, an updated set of prediction coefficients $a_k$ will be sent over the uplink feedback channel 5.

An uplink receiver 13 of the base station 2 receives the feedback message and reconstructs the feedback message by standard radio processing (channel estimation, demodulation, encoding). A feedback de-multiplexing unit 14 reconstructs both the error coefficients $e_n$ and the prediction coefficients $a_k$.

The actual estimated channel $h_n$ at time step n can be obtained by summing up the predicted channel coefficient $\tilde{h}_n$ on previous channel estimates $h_{n-k}$ and the current set of prediction coefficients $a_k$) and the respective error coefficient $e_n$:

$$h_n = e_n + \tilde{h}_n = e_n + \sum_{k=1}^{p} a_k h_{n-k}.$$

However, as there is a certain delay in the feedback message (it has to be encoded and mapped onto a transport channel, the transmission and detection needs time etc.), the base station 2 may use this information typically only on a later time step (at earliest at n+1) so that in addition to the feedback reconstruction, a channel extrapolation/prediction will be required, which is performed in a channel prediction and extrapolation unit 15, in the following way:

As the coefficients $a_k$ are only slowly changing (much slower than the feedback delays), they can be assumed as constant for the prediction/extrapolation. What is missing is the error coefficient for one or more discrete (future) time steps. For the following extrapolation, it is proposed to set missing coefficients $e_{n+1}$, etc. to zero. For the simple example of a feedback delay of only one time step, assuming that the older channels coefficients $h_{n-k}$ are already corrected by their respective error coefficients $e_{n-k}$, the new extrapolated (predicted) channel is just $$\tilde{h}_n = \sum_{k=1}^{p} a_k h_{n-k}.$$

The above extrapolation allows one to improve the channel knowledge at the base station 2, as it already partly compensates for the evolution of the fast fading during the feedback delay duration.

Moreover, feedback overhead is reduced due to the fact that less bits are required to quantize the error $e_n$ than the channel $h_n$, as there is already a prediction $$\tilde{h}_n = \sum_{k=1}^{p} a_k h_{n-k}$$

available which comes close to the actual channel estimate $h_n$, as the slow feedback component from the prediction coefficients $a_k$ is negligible versus the fast evolution of the error coefficients $e_n$.

Although in the above description, the estimation of a channel coefficient $h_n$ has been explained with respect to a single channel, the approach described herein may be easily extended to a MIMO system by predicting a coefficient matrix $H_n$, instead of predicting a single channel coefficient $h_n$. Usually, the autocorrelation of the temporal fading is the same for all antennas of the MIMO scheme, so that only a single set of prediction coefficients $a_k$ needs to be transmitted for all antennas in order to reduce the required feedback rates.

An extension to multipath channels in the time-domain representation is also possible. In this case, for each multipath tap, a MIMO coefficient matrix is required. Again, for typical radio channels such as the downlink channel 4, the required feedback rates may be reduced by transmitting only a single set of prediction coefficients $a_k$ for all antennas and multipath taps, possibly in conjunction with individual prediction error coefficients plus individual initial channel states. Alternatively, the same kind of approach may be used for a frequency domain representation of the multipath channel on a per-subcarrier or per-subband basis.

When the time-domain representation of the multipath channel is used, an extension employing a compressed time-domain feedback may be used, as discussed in [2], which proposed to provide a large amount of feedback reduction by concentrating on the strongest channel taps. The approach described herein may now further reduce the feedback overhead by combining the compression method ("rake compression") as described in [2] with the (linear) prediction method as described above for each of the (strongest) channel taps.

In summary, the above approach provides an efficient and powerful way to extend feedback: Spectral efficiency of mobile communication systems may be improved by improving the channel knowledge and reducing the feedback signaling overhead. Additionally, the above approach fights the adverse effects caused by feedback delay and gives the base station a very good support in order to extrapolate the channel and thus to provide an improved channel knowledge accuracy. Moreover, the channel prediction feedback as proposed herein is a source coding approach which reduces the required feedback rate. This is achieved by separating long-term and short-term components of the channel. Moreover, the above approach is compatible with and may be combined with other efficient mechanisms for feedback rate reduction, e.g. the approach described in [2].

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Also, the description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

REFERENCES

[1] J. Makhoul. Linear prediction: A tutorial review. Proceedings of the IEEE, 63 (5): 561-580, April 1975.
[2] T. Wild, "A rake-finger based efficient channel state information feedback compression scheme for the MIMO OFDM FDD downlink," in *Proc. Vehicular Technology Conf. (VTC-Spring)*, May 2010
[3] S. Valentin, T. Wild, "Studying the sum capacity of mobile multiuser diversity systems with feedback errors and delay", in *Proc. Vehicular Technology Conf. (VTC-Fall)*, September 2010

The invention claimed is:

1. A method for providing channel state information about a radio channel established between a first network element and a second network element, the method comprising:
   providing an estimate of a channel coefficient of the radio channel for a time step n based on at least one signal, in particular a pilot signal, transmitted over the radio channel from the first network element to the second network element,
   making a prediction of the channel coefficient of the radio channel for the same time step n based on previous estimates;
   feeding back information about an error between the prediction and the estimate of the channel coefficient from the second network element to the first network element, wherein the prediction of the channel coefficient is based on a time series of previous estimates combined with prediction coefficients, in particular with linear prediction coefficients; and
   updating the prediction coefficients, and providing feedback information about the updated prediction coefficients from the second network element to the first network element, the information about the updated prediction coefficients being fed back less frequently than the information about the error between the prediction and the estimate.

2. The method according to claim 1, wherein the radio channel is one of a plurality of MIMO channels between the first network element and the second network element, and wherein only a single set of updated prediction coefficients is fed back for all MIMO channels.

3. The method according to claim 1, wherein the radio channel is a multipath channel and wherein only a single set of updated prediction coefficients is fed back for the multipath channel.

4. The method according to claim 1, further comprising: multiplexing and encoding the information about the error and the information about the updated prediction coefficients, and providing both types of feedback from the second network element to the first network element using the same feedback channel.

5. The method according to claim 1, further comprising:
in the first network element, estimating the channel coefficient by making a prediction of the channel coefficient, and correcting the prediction using the feedback information about the error between the prediction and the estimate.

6. A network element, in particular mobile terminal, configured to provide channel state information about a radio channel, comprising at least one processor configured to:
provide an estimate of a channel coefficient of the radio channel for a time step n based on at least one signal, in particular a pilot signal, received from a further network element over the radio channel;
make a prediction of the channel coefficient of the radio channel for the same time step n based on previous estimates; and
provide feedback information about an error between the prediction and the estimate of the channel coefficient to the further network element,
wherein
the at least one processor is configured to make the prediction of the channel coefficient based on a time series of previous estimates combined with prediction coefficients, in particular with linear prediction coefficients;
update the prediction coefficients; and
provide feedback information about the updated prediction coefficients from the network element to the further network element, the information about the updated prediction coefficients being fed back less frequently than the information about the error between the prediction and the estimate.

7. The network element according to claim 6, wherein the radio channel is one of a plurality of MIMO channels between the network element and the further network element, and wherein the at least one processor is adapted to feed back only a single set of updated prediction coefficients for all MIMO channels.

8. The network element according to claim 6, wherein the radio channel is a multipath channel and wherein the at least one processor is adapted to feed back only a single set of updated prediction coefficients for the multipath channel.

9. The network element according to claim 6, wherein the at least one processor is further adapted to multiplex and encode the information about the error and the information about the updated prediction coefficients, and to provide both types of feedback from the network element to the further network element using the same feedback channel.

10. A network element, in particular base station, configured to estimate a channel coefficient of a radio channel for a time step n, the network element comprising at least one processor configured to:
receive information about an error between a prediction and an estimate of the channel coefficient of the radio channel at the time step n from a further network element, the prediction of the channel coefficient being based on a time series of previous estimates combined with prediction coefficients, in particular with linear prediction coefficients;
receive feedback information about updated prediction coefficients from the the further network element, the information about the updated prediction coefficients being received less frequently than the information about the error between the prediction and the estimate;
estimate the channel coefficient by making a prediction of the channel coefficient based on previous estimates; and
correct the prediction using the feedback information about the error between the prediction and the estimate.

11. A wireless communication network, comprising:
at least one network element according to claim 10; and,
at least one network element comprising at least one processor configured to—
provide an estimate of a channel coefficient of the radio channel for a time step n based on at least one signal, in particular a pilot signal, received from a further network element over the radio channel,
make a prediction of the channel coefficient of the radio channel for the same time step n based on previous estimates, and
provide feedback information about an error between the prediction and the estimate of the channel coefficient to the further network element, wherein the processing means are adapted to make the prediction of the channel coefficient based on a time series of previous estimates combined with prediction coefficients, in particular with linear prediction coefficients
update the prediction coefficients; and
provide feedback information about the updated prediction coefficients from the network element to the further network element, the information about the updated prediction coefficients being fed back less frequently than the information about the error between the prediction and the estimate.

* * * * *